United States Patent [19]
Arai et al.

[11] Patent Number: 6,103,642
[45] Date of Patent: Aug. 15, 2000

[54] STAIN RESISTANT SHEET MATERIAL

[75] Inventors: Gunji Arai; Osamu Tanida, both of Fukui, Japan

[73] Assignee: Kanbo Pras Corporation, Japan

[21] Appl. No.: 09/172,812

[22] Filed: Oct. 15, 1998

[51] Int. Cl.[7] ............................................. B32B 27/04
[52] U.S. Cl. ..................... 442/62; 442/71; 442/72; 442/68; 442/66; 442/67; 442/93
[58] Field of Search ................................. 442/62, 64, 71, 442/72, 66, 67, 68, 93

[56] References Cited

U.S. PATENT DOCUMENTS 5,271,992  12/1993  Siener, Jr. et al. .
5,529,835   6/1996  Siener, Jr. et al. .

*Primary Examiner*—Christopher Raimund
*Attorney, Agent, or Firm*—D. Peter Hochberg; William H. Holt

[57] ABSTRACT

A stain resistant laminated sheet material is provided which comprises: a base fabric; a stain resistant resin layer provided on at least one side of the base fabric; and a color layer provided on the stain resistant resin layer. The color layer is soluble in a particular solvent in which the stain resistant resin layer is insoluble.

6 Claims, 1 Drawing Sheet

STAIN RESISTANT SHEET MATERIAL

TECHNICAL FIELD

The present invention relates to a sheet material which has a superior stain resistant property and is suitable for use in formation of a sign on a signboard, particularly an illumination signboard (a backlit signboard), an awning, a truck hood or the like by a stencil etch-away patterning method.

BACKGROUND ART

Conventionally, formation of a sign on a sheet signboard such as a backlit signboard, an awning, a truck hood or the like is achieved in such a manner that a desired color film is cut into a desired sign pattern which is in turn pasted on a base sheet. Where a pale color sign is to be formed on a dark color background, a stencil cut-away patterning method is employed in which a sign portion is removed from a color film and the resulting film is pasted on a base sheet. Further, Japanese Unexamined Patent Publication No. 5-8364 (1993) discloses a stencil etch-away patterning method in which a removable color layer is preliminarily formed on a base layer of a laminated sheet such as used for an illumination signboard (or a backlit signboard) and a desired portion of the color layer is removed with the use of a solvent for formation of a sign on the sheet. In these arts, the base sheet or layer is composed of a vinyl chloride resin composition which contains a plasticizer in a proportion of several tens percent. The plasticizer is liable to migrate to the surface of the base layer with time to adsorb dust, which contaminates the surface of the sheet. To overcome this drawback, a conventional sign sheet is laminated with a stain resistant film or coated with a stain resistant resin composition.

Japanese Unexamined Patent Publication No. 5-8364 further discloses an art in which a barrier layer is formed on the base layer for prevention of the migration of the plasticizer and the color layer (third layer) is formed on the barrier layer. This art, however, requires additional steps and time for the formation of the barrier layer. Further, when the barrier layer is formed by coating with a coating resin composition, the plasticizer contained in a great amount in the base layer may leach out into an organic solvent contained in the coating resin composition or migrate to the barrier layer. Moreover, when the resulting sheet is used at a high temperature, the liquid plasticizer is liable to migrate to the surface of the barrier layer because the barrier layer is fairly thin. Therefore, this art may lead to impairment of the stain resistant property of the sheet.

DISCLOSURE OF THE INVENTION

It is an object of the present invention to solve the aforesaid problems and to provide a sheet material which is suitable for formation of a sign by the stencil etch-away patterning method, has a simple structure and a superior stain resistant property and is substantially free from migration of a liquid plasticizer.

For achievement of the aforesaid object, the present invention has the following features:
1. A stain resistant laminated sheet material is provided which comprises: a base fabric; a stain resistant resin layer provided on at least one side of the base fabric; and a color layer provided on the stain resistant resin layer, the color layer being soluble in a particular solvent in which the stain resistant resin layer is insoluble.
2. In the stain resistant sheet material, the stain resistant resin layer is composed of a resin composition which comprises 100 parts by weight of a vinyl chloride resin and 20 to 100 parts by weight of a thermoplastic elastomer compatible with the vinyl chloride resin.
3. In the stain resistant sheet material described in the item 2, the resin composition forming the stain resistant resin layer further comprises not greater than 30 parts by weight of a liquid plasticizer based on 100 parts by weight of the vinyl chloride resin.
4. In the stain resistant sheet material described in the item 2, the resin composition forming the stain resistant resin layer contains no liquid plasticizer.
5. A stain resistant laminated sheet material is provided which comprises: a base fabric; a stain resistant resin layer provided on one side of the base fabric; a color layer provided on the stain resistant resin layer; and a translucent thermoplastic resin layer provided on the other side of the base fabric.

In the present invention, the resin composition forming the stain resistant resin layer may comprise a liquid plasticizer, a stabilizer, an ultraviolet ray absorber, a flame resistant agent, a pigment and a like additive, as required, in addition to 100 parts by weight of the vinyl chloride resin and 20 to 100 parts by weight of the thermoplastic elastomer.

In accordance with the present invention, the addition of the thermoplastic elastomer which provides substantially the same effect as the liquid plasticizer can drastically reduce the use of the liquid plasticizer which may cause contamination of the sheet. Therefore, the migration of the liquid plasticizer to the surface of the product sheet is substantially prevented, so that the stain resistant property of the sheet can be ensured over an extended period. Since no liquid plasticizer or a very small amount of a liquid plasticizer, if any, is used in the present invention, the weatherability of the sheet can be improved.

Examples of the vinyl chloride resin to be used in the present invention include polymers of vinyl chloride, copolymers of vinyl chloride and vinyl acetate and copolymers of vinyl chloride and acrylate. These may be used either alone or in combination.

Examples of the thermoplastic elastomer to be used in the present invention include polyurethane elastomers, polyolefin elastomers, polyester elastomers, polyamide elastomers, ethylene-vinyl acetate elastomers, fluorinated rubbers, natural rubbers, trans-polyisoprene elastomers, chlorinated polyethylene elastomers and alloys of crosslinked chlorinated ethylene copolymers, which-can be blended with the vinyl chloride resin. The thermoplastic elastomer is typically used in a proportion of 20 to 100 parts by weight based on 100 parts by weight of the vinyl chloride resin.

Examples of the liquid plasticizer include: phthalates such as diheptyl phthalate, di-2-ethylhexyl phthalate and diisooctyl phthalate; adipates such as diisobutyl adipate, di-2-ethylhexyl adipate and diisodecyl adipate; sebacates such as di-2-ethylhexyl sebacate and di-n-butyl sebacate; azelates such as di-2-ethylhexyl azelate; and phosphates such as trichloroethyl phosphate. These may be used either alone or in combination, typically, in a proportion of not greater than 30 parts by weight based on 100 parts by weight of the vinyl chloride resin.

Examples of the stabilizer include calcium/zinc based stabilizers, calcium/zinc based organic composite stabilizers, barium/zinc based stabilizers and cadmium/barium based stabilizers. These may be used either alone or in combination, typically, in a proportion of 0.1 to 10 parts by weight based on 100 parts by weight of the vinyl chloride resin.

Examples of the ultraviolet ray absorber include: benzophenones such as 2-hydroxy-4-n-octoxybenzophenone and 2,2',4,4'-tetrahydroxybenzophenone; benzotriazoles such as (2'-hydroxyphenyl)benzotriazole; cyanoacrylates such as ethyl 2-cyano-3, 3'-diphenylacrylate; and salicylates such as phenyl salicylate. These may be used either alone or in combination, typically, in a proportion of 0.5 to 5 parts by weight based on 100 parts by weight of the vinyl chloride resin.

Examples of the flame resistant agent include antimony trioxide, tricresyl phosphate, cresyl diphenyl phosphate and tris(2,3-dibromopropyl) phosphate. The flame resistant agent is typically used in a proportion of not greater than 20 parts by weight based on 100 parts by weight of the vinyl chloride resin.

Usable as the pigment are inorganic pigments and organic pigments. Examples of specific inorganic pigments include titanium oxide, cadmium pigments, iron oxide red, ultramarine blue and chrome yellow. Examples of specific organic pigments include azo pigments, phthalocyanine pigments, lake pigments, anthraquinone pigments, quinacridone pigments and alizarin lake pigments. These may be used either alone or in combination, typically, in a proportion of 0.5 to 5 parts by weight based on 100 parts by weight of the vinyl chloride resin.

As required, additives such as an anti-oxidant, a lubricant and a mildew resistant agent may be blended with the vinyl chloride resin in a proportion of not greater than 10 parts by weight based on 100 parts by weight of the vinyl chloride resin.

Examples of the solvent to be used for removing a part of the color layer of the sheet material of the present invention include chlorosulfonic acid, dichlorobenzene, diethyl ether, tetrachloroethylene, acetone, methyl ethyl ketone, toluene, cyclohexane, xylene, ethyl acetate and butyl acetate. These may be used either alone or in combination.

Examples of a resin for the thermoplastic resin layer to be formed on a surface of the base fabric opposite to the stain resistant resin layer include polyvinyl chloride resins, ethylene-vinyl acetate resins, polyurethane resins, polyolefin resins and polyester resins. These may be used either alone or in combination. Depending on the resin to be selected, any of the aforesaid liquid plasticizers, stabilizers, flame resistant agents and like additives may be added to the resin in a proper amount. Where the sheet material is to be used for a backlit signboard, the thermoplastic resin layer is translucent.

A commercially available ink may be used for the color layer, which contains 10 to 20% of a mixture of an acrylic resin and a copolymer of vinyl chloride and vinyl acetate, 5 to 25 % of any of the aforesaid pigments and an organic solvent such as methyl ethyl ketone, toluene, cyclohexane, xylene or ethyl acetate. Where such a commercially available ink is used for the color layer, an organic solvent may, as required, be added to the ink in a proportion of not greater than 30 parts by weight based on 100 parts by weight of the ink for adjustment of the viscosity of the ink.

With the feature described in the item 1, the sheet material has a simple structure and a superior stain resistant property and is suitable for formation of a sign by the stencil etch-away patterning method. Particularly, where the thermoplastic elastomer is blended with the resin composition for the stain resistant resin layer as described in the item 2, the use of the liquid plasticizer which may cause the contamination of the sheet material can be avoided as described in the item 4, or the amount of the liquid plasticizer to be used can be reduced to not greater than 30 parts by weight based on 100 parts by weight of the vinyl chloride resin as described in the item 3. Thus, the stain resistant property of the sheet material can be ensured over an extended period. Further, with the feature described in the item 5, the formation of the translucent thermoplastic resin layer on the other side of the base fabric imparts the sheet material with a light transmitting property and a water resistant property.

DESCRIPTION OF EMBODIMENT

Figure 1:
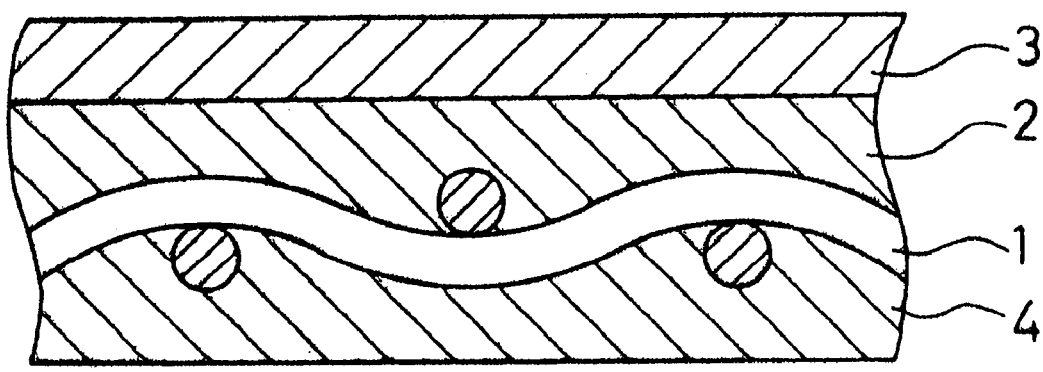
FIG. 1 is a sectional view illustrating an exemplary stain resistant sheet material according to the present invention.

FIG. 1 illustrates an exemplary stain resistant sheet material according to the present invention.

In FIG. 1, a four-layer sheet material for a backlit signboard is shown which includes a base fabric 1, a stain resistant resin layer 2 provided on one side of the base fabric 1, a color layer 3 provided on the stain resistant resin layer 2, and a thermoplastic resin layer 4 provided on the other side of the base fabric 1. The base fabric 1 is covered and sealed with the thermoplastic resin layer 4 and the stain resistant resin layer 2. The base fabric 1 is woven from a 250-denier polyester filament with a density of 30 lines×29 lines (warp×weft) per 25.4 mm×25.4 mm.

The filament for the base fabric 1 is preliminarily subjected to a water proofing process with the use of a resin suitable for this purpose.

The formulations of a stain resistant resin composition for the stain resistant resin layer 2, an ink composition for the color layer 3 and a thermoplastic resin composition for the thermoplastic resin layer 4 are shown in Tables 1, 2 and 3, respectively.

TABLE 1

Formulation of Stain resistant resin composition for stain resistant resin layer

| Formulation | Ingredient | Trade Name | Parts by wt. |
| --- | --- | --- | --- |
| Vinyl chloride | Suspension-polymerized straight polymer | VINYCHLONE 3000M (Mitsui Toatsu Chemical Co., Ltd.) | 100 |
| Thermoplastic elastomer | Alloy of crosslinked chlorinated ethylene copolymer | ALCRINE 2070NC (Mitsui Du Pont Chemical Co., Ltd.) | 40 |
| Liquid plasticizer | Di-2-ethylhexyl phthalate | — | 10 |
| Stabilizer | Ba/Zn based | LT700T-1A (Akishima Chemical Industry Co., Ltd.) | 3 |
| Flame resistant agent | Antimony trioxide | — | 5 |
| Pigment | Titanium oxide | — | 2 |
| UV absorber | 2-hydroxy-4-n-octoxy-benzophenone | — | 0.5 |

TABLE 2

Formulation of ink composition for color layer

| Formulation | Ingredient | Trade name | Parts by wt. |
|---|---|---|---|
| Ink | — | VSKH 5003 (Dainichiseika Co., Ltd.) | 100 |
| Solvent* | Methyl Ethyl ketone | — | 5 |

*For viscosity adjustment

TABLE 3

Formulation of thermoplastic resin composition for thermoplastic resin layer

| Formulation | Ingredient | Trade name | Parts by wt. |
|---|---|---|---|
| Vinyl chloride | Suspension-polymerized straight polymer | VINYCHLONE 3000M (Mitsui Toatsu Chemical Co., Ltd.) | 100 |
| Liquid plasticizer | Di-2-ethyl-hexyl phthalate | | 60 |
| Stabilizer | Ba—Zn based | LT700T-1A (Akishima Chemical Industry Co., Ltd.) | 3 |

The base fabric is preheated, and directly calender coated with a resin film of the stain resistant resin composition prepared in accordance with the aforesaid formulation for formation of the stain resistant resin layer. Thus, the adhesion of the stain resistant resin layer onto the base fabric is promoted.

In turn, the base fabric having the stain resistant resin layer on one side thereof is tuned upside down, and the thermoplastic resin layer is formed of the thermoplastic resin composition on the other side of the base fabric through calender coating in substantially the same manner as the formation of the stain resistant resin layer. Further, the color layer is formed of the ink composition on the stain resistant resin layer by means of a gravure printer.

The thermoplastic resin layer has a thickness of 0.20 to 0.25 mm, and the stain resistant resin layer has a thickness of 0.15 to 0.20 mm. Further, the color layer has a thickness of 10 $\mu$. The total thickness of the laminated sheet material including the base fabric is about 0.47 mm.

The formulation of a remover for removal of a part of the color layer is shown in Table 4.

TABLE 4

Formulation of remover

| Formulation | Ingredient | Parts by wt. |
|---|---|---|
| Solvent | Methyl ethyl ketone | 50 |
| | Toluene | 50 |

EXAMPLE 1

Test samples were prepared from a stain resistant sheet material prepared in the aforesaid manner. A part of the color layer of each of the test samples was removed with the use of the remover prepared in accordance with the formulation shown in Table 4. The test samples were respectively heated in ovens regulated at temperatures of 20° C. and 80° C. for one hour. Thereafter, the test samples were stirred in a contaminant compound for about one hour by means of a stirrer. Then, the test samples were respectively subjected to no treatment, to a rinse treatment in which a test sample was rinsed with water for one minute, and to a rinse and wipe treatment in which a test sample was rinsed with water for one minute and then wiped with a cotton cloth. For evaluation of the stain resistant property of the sheet material, color changes of the test samples were checked with reference to a JIS L0805 gray scale.

Comparative Example 1

Thermoplastic resin layers were formed on opposite sides of a base fabric through calender coating, and a color layer was formed on the surface of one of the thermoplastic resin layers. A part of the color layer was removed in the same manner as described above with the use of the remover. Then, the stain resistant properties of the resulting sheet at 200° C. and 80° C. were evaluated.

Comparative Example 2

Thermoplastic resin layers were formed on opposite sides of a base fabric through calender coating, and the surface of one of the thermoplastic resin layers was coated with an acrylic resin for formation of a barrier layer. Then, the stain resistant properties of the resulting sheet at 200 ° C. and 80° C. were evaluated.

Comparative Example 3

Thermoplastic resin layers were formed on opposite sides of a base fabric through calender coating. The surface of one of the thermoplastic resin layers was coated with an acrylic resin for formation of a barrier layer, and then a color layer is formed on the barrier layer. A part of the color layer was removed in the same manner as described above with the use of the remover. Then, the stain resistant properties of the resulting sheet at 20° C. and 80° C. were evaluated.

The evaluation results of Example 1 and Comparative Examples 1 to 3 described above are shown in Table 5. The heat treatment at 80° C. was intended to promote migration of the liquid plasticizer.

TABLE 5

| Treatment temperature | Treatment method after contamination | Ex. 1 | Com. Ex. 1 | Com. Ex. 2 | Com. Ex. 3 |
|---|---|---|---|---|---|
| | No treatment | 3 | 1–2 | 3 | 2 |
| | Water rinse | 3 | 2 | 3 | 2 |
| | Wipe after water rinse | 4–5 | 2–3 | 3–4 | 3–4 |
| | No Treatment | 2 | 1 | 2 | 1 |
| | Water rinse | 2–3 | 1 | 2 | 1–2 |
| | Wipe after water rinse | 4 | 2 | 3 | 2–3 |

1–5 scale rating (1: Worst, 2: Bad, 3: Intermediate, 4: Good, 5: Excellent)

As can be understood from the results shown in Table 5, the stain resistant sheet material of Example 1 exhibited a superior stain resistant property to the sheets subjected to the stain resistance imparting process through coating with the acrylic resin as well as the conventional sheet not subjected to the stain resistance imparting process in a temperature range from 20° C. (ordinary temperature) to 80° C. (high temperature).

The stain resistant sheet material according to the present invention does not particularly limit a solvent to be used as the remover for the removal of the color layer. Even if a solvent mixture of methyl ethyl ketone and toluene is used thereby to lead to slight dissolution of the stain resistant resin composition, it is apparent that a superior stain resistant property can be ensured. This obviates the need to select a special solvent for the removal of the color layer in consideration of the properties of the barrier layer as in the case of the conventional sheet material.

What is claimed is:

1. A stain resistant laminated sheet material comprising:

a base fabric;

a stain resistant layer of a stain resistant resin composition provided on at least one side of the base fabric wherein the stain resistant resin composition comprises 100 parts by weight of a vinyl chloride resin and 20 to 100 parts by weight of a thermoplastic elastomer compatible with the vinyl chloride resin;

and a color layer provided on the stain resistant resin layer, the color layer being soluble in a particular solvent in which the stain resistant resin layer is insoluble.

2. A stain resistant sheet material as set forth in claim 1, wherein the stain resistant resin composition further comprises not greater than 30 parts by weight of a liquid plasticizer based on 100 parts by weight of the vinyl chloride resin.

3. A stain resistant sheet material as set forth in claim 1, wherein the stain resistant resin composition contains no liquid plasticizer.

4. A stain resistant laminated sheet material as set forth in claim 1, wherein the stain resistant resin layer is provided on one side of the base fabric and the color layer is provided on the stain resistant resin layer, the stain resistant sheet material further comprising a translucent thermoplastic resin layer provided on the other side of the base fabric.

5. A stain resistant laminated sheet material as set forth in claim 2, wherein the stain resistant resin layer is provided on one side of the base fabric and the color layer is provided on the stain resistant resin layer, the stain resistant sheet material further comprising a translucent thermoplastic resin layer provided on the other side of the base fabric.

6. A stain resistant laminated sheet material as set forth in claim 3, wherein the stain resistant resin layer is provided on one side of the base fabric and the color layer is provided on the stain resistant resin layer, the stain resistant sheet material further comprising a translucent thermoplastic resin layer provided on the other side of the base fabric.

* * * * *